INVENTORS
ARTHUR L. LEE
ARTHUR B. COVAL
BY Stanley J. Price

THEIR ATTORNEY

INVENTORS
ARTHUR L. LEE
ARTHUR B. COVAL
BY
THEIR ATTORNEY

United States Patent Office 3,176,813
Patented Apr. 6, 1965

3,176,813
CENTRIFUGALLY ACTUATED FLUID CLUTCH
Arthur L. Lee and Arthur B. Coval, Columbus, Ohio, assignors to Consolidation Coal Company, Pittsburgh, Pa., a corporation of Pennsylvania
Filed Aug. 30, 1962, Ser. No. 220,429
12 Claims. (Cl. 192—85)

This invention relates to a centrifugally actuated clutch and more particularly to a heavy duty centrifugally actuated clutch having a plurality of clutch discs that are frictionally engaged by the centrifugal force exerted on a fluid within a chamber.

The constant mesh power shift transmission disclosed in our copending application Serial No. 54,253, now Patent No. 3,064,488, entitled "Constant Mesh Transmission" is superior to the conventional manual shift transmission and has been successfully used in both on-highway and off-highway vehicles.

In off-highway vehicles, where smooth operation and minimum shock loads are of the essence, a fluid drive input to the transmission is provided for a load cushioning effect as the transmission is power shifted from one speed ratio to another. In on-highway vehicles, where fuel economy is of the essence, a direct drive from the engine to the transmission provides the greatest mechanical efficiency. The direct drive arrangement has a disadvantage, however, in that in certain transitions from one speed ratio to another, the shifting is not as smooth as when a fluid drive input is employed.

To eliminate the rough shifting in on-highway vehicles, we provide a heavy duty master clutch associated with the engine that is engaged throughout a majority of the vehicle operation and may be disengaged only when a shift from certain speed ratios is required. This master clutch smooths out the operation of the transmission and yet retains substantially all the mechanical efficiency of a direct drive arrangement. Our heavy duty master clutch is centrifugally actuated and has a novel means for cooling the clutch discs with the same fluid employed to actuate the clutch.

Briefly, our centrifugally actuated clutch includes a housing member secured to and rotatable with the engine shaft. A clutch output shaft extends into the housing and has a plurality of clutch discs secured thereto. The housing has clutch discs interleaved between the output shaft clutch discs. An actuator is arranged to move the discs axially into frictional engagement to transmit torque from the engine shaft to the clutch output shaft. Within the housing there is a chamber that has an inlet opening arranged to be connected to the engine lubricating system. The chamber has an outlet opening which is connected to a sump. Engine lubricating oil continually circulates through the chamber when the clutch is disengaged. Valve means are provided to close the chamber outlet opening and the fluid trapped within the rotating chamber, due to the centrifugal force generated by the rotation of the housing, moves the actuator to engage the clutch discs. The chamber has passageways extending into another portion of the housing. The passageways provide a path for the excess lubricant from the chamber into the housing when the clutch is engaged. The excess lubricant flows through the passageways and around the clutch discs to serve as a clutch cooling means. The valve means are controlled by a separate source of fluid under pressure and provide a positive means to engage and disengage the clutch discs. With our improved centrifugally operated clutch we have provided an efficient master clutch mechanism that engages smoothly and substantially eliminates the shock loads on the vehicle during a transition from one speed ratio to another. Our master clutching mechanism provides certain advantages of a fluid coupling and yet retains the high mechanical efficiency of a direct mechanical connection between the engine and the power shift constant mesh transmission.

Accordingly, the principal object of this invention is to provide a centrifugally actuated clutch that has a positive means to engage and disengage the clutch discs.

Another object of this invention is to provide a centrifugally actuated clutch that uses engine lubricating oil as the fluid to actuate the clutch.

Another object of this invention is to provide a clutch that is actuated solely by means of the centrifugal force exerted on a fluid.

Another object of this invention is to provide a centrifugally actuated clutch wherein the same fluid that actuates the clutch provides a cooling means for the clutch disc.

These and other objects and advantages of this invention will be more completely described and distinctly pointed out in the following specification, the accompanying drawings and the appended claims.

Figures 1, 2:
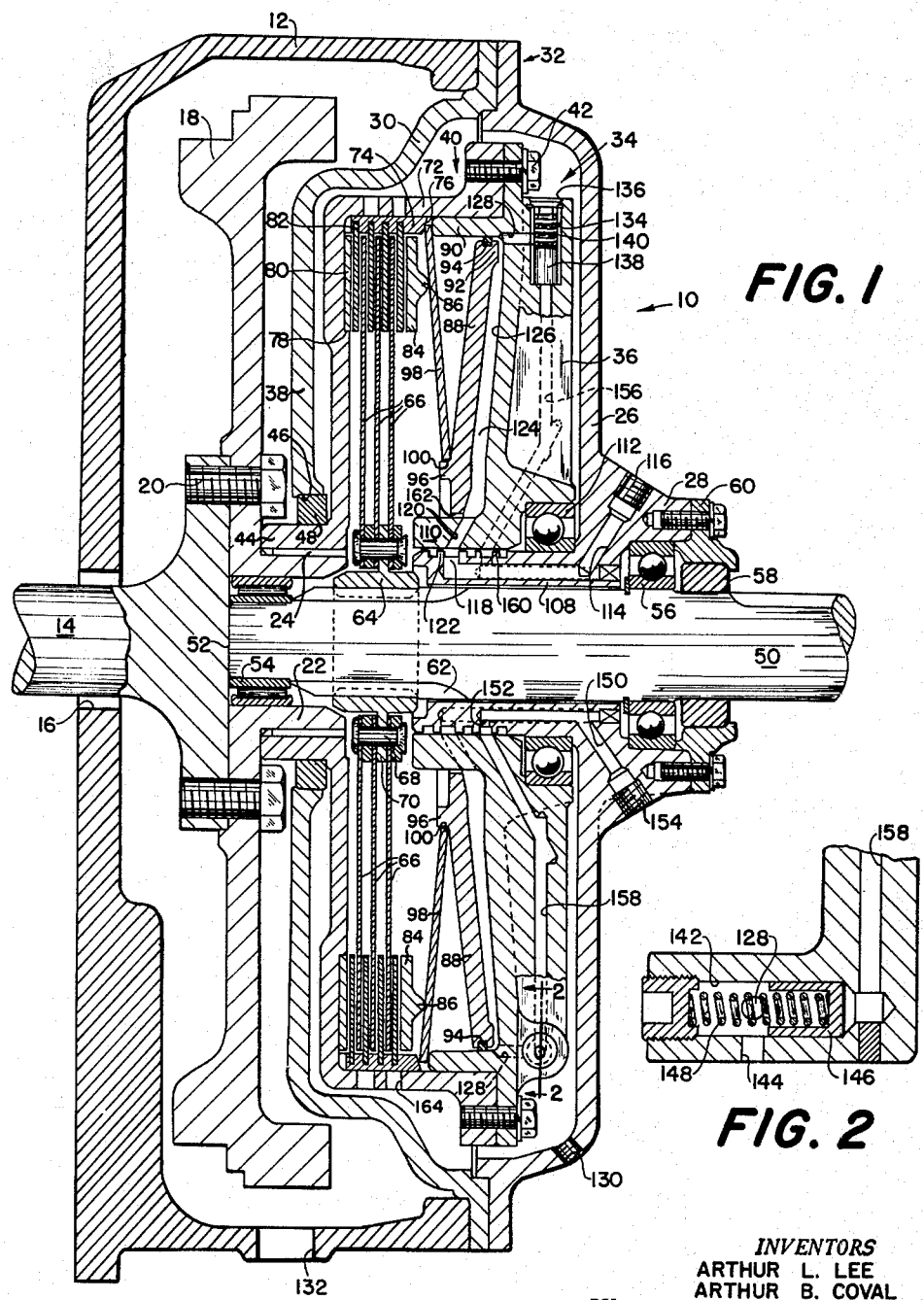
FIGURE 1 is a vertical section of our improved clutch in the disengaged position.
FIGURE 2 is a view in section taken along the lines 2—2 illustrating one of the valves in an open position.

Referring to the drawings there is shown a clutch generally designated by the numeral 10 having a fixed housing 12. An engine drive or crank shaft 14 extends through an aperture 16 in fixed housing 12. A fly wheel 18 is secured to crank shaft 14 by means of bolts 20. The fly wheel 18 has an annular flange 22 extending forwardly therefrom with external splines 24.

The fixed housing 12 has a front wall 26 with a forwardly extending annular flange 28 and an intermediate wall 30. The front wall 26 and intermediate wall 30 are suitably secured at 32 by means of bolts or the like. The sectional view illustrated in FIGURES 1 and 3 does not indicate the bolt apertures nor the bolt securing the walls 26 and 30 to the remaining portion of housing 12. It should be understood, however, that any suitable means for detachably securing walls 26 and 30 to the remainder of housing 12 may be provided.

A rotary clutch housing generally designated by the numeral 34 has a front portion 36 and a rear portion 38 that are fixedly joined to each other at their outer circumferential edge 40 by means of bolts 42. The rotary housing rear portion 38 has a rearwardly extending internally splined hub 44 which is nonrotatably secured to splines 24 on annular flange 22 so that the housing 34 rotates with the fly wheel 18 and with the engine crank shaft 14. The fixed housing intermediate wall 30 has an aperture 46 through which the hub 44 extends. A bearing 48 permits relative rotation between fixed housing intermediate wall 30 and rotary housing 34. A clutch output shaft 50 is axially aligned with engine crank shaft 14. The fly wheel annular flange 22 extends over the end 52 of output shaft 50. Needle bearings 54 are positioned between clutch output shaft 50 and annular flange 22 to permit relative rotation between clutch output shaft 50 and engine crank shaft 14. The fixed housing forwardly extending annular flange 28 has support bearings 56 which support the clutch output shaft 50 within fixed housing 12. A fluid seal 58 extends around clutch output shaft 50. An annular bearing retainer 60 maintains bearings 56 in place.

The clutch output shaft 50 has an externally splined intermediate portion 62. Internally splined sleeve 64 is nonrotatably positioned on externally splined portion 62 and is movable axially relative to clutch output shaft 50. A plurality of annular discs 66 are secured adjacent their inner circumferential edge portion to sleeve 64 by means of rivets 68. The sleeve 64 has an annular flange 70 to which the discs 66 are secured by means of the rivets 68.

The rotary housing rear portion 38 has a forwardly extending outer annular portion 72 which forms a part of the outer circumferential edge 40 of rotary housing 34. The annular portion 72 inner surface has an internally splined portion 74 with a front edge 76. The housing rear portion 38 has an annular recess 78 in which an annular back-up plate 80 is positioned. A plurality of externally splined friction discs 82 are nonrotatably secured to the inner portion of outer annular portion 72 and are axially movable relative thereto. The disc 82 are interleaved between the discs 66. An annular pressure plate 84 is positioned in abutting relation with the front annular disc 82 and has an intermediate forwardly extending annular boss 86. With this arrangement axial movement of the pressure plate 84 toward rotary housing rear wall 38 frictionally engages discs 82 to discs 66 to thereby transmit torque from engine crank shaft 14 to clutch output shaft 50.

Figure 5:
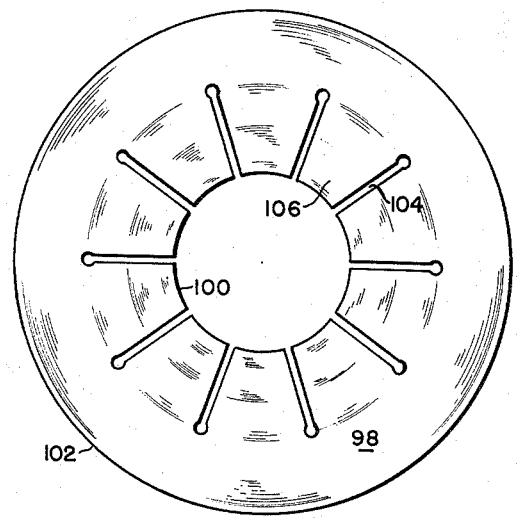
FIGURE 5 is a view in front elevation of the resilient actuating lever.

An annular piston 88 is positioned within the rotary housing 34. The rotary housing front portion 36 has an inwardly extending annular flange 90 and the circumferential edge 92 of piston 88 is positioned in abutting relation with the annular flange 90. An O-ring 94 provides a fluid seal between the piston circumferential edge 92 and the inner wall of annular flange 90. The piston 88 has an inwardly extending annular shoulder 96 in spaced relation to outer edge 92. An annular resilient actuating lever 98 which has an inner circumferential edge 100 and an outer circumferential edge 102 is positioned between the piston 88 and the pressure plate 84. The actuating lever 98 is constructed of resilient spring-like metal and functions similar to the well-known Belleville spring. The actuating lever 98 has a plurality of radially extending slots 104 (see FIGURE 5) which form inwardly extending fingers 106 in actuating lever 98. The lever 98 is positioned with its circumferential edge 102 between the housing splined portion front edge 76 and the housing front portion internally extending annular flange 90 to provide a pivotal connection for the lever 98. The lever inner circumferential edge 100 abuts piston shoulder 96 and the pressure plate boss 86 abuts an intermediate portion of lever 98. This arrangement provides a second class lever wherein the lever is fulcrumed at its outer circumferential edge 102 and provides a force multiplying lever wherein the greater force is exerted by lever 98 on pressure plate 84 than the force exerted by piston 88 on lever 98. This results in the application of a greater force to pressure plate 84 to thereby frictionally engage the annular discs 66 and 82.

The fixed housing front wall 26 has an inwardly extending annular flange 108 and the rotary housing front end portion 36 has an overlying inwardly extending annular flange 110. A bearing 112 rotatably supports the rotary housing front end portion 36 on fixed housing flange 108. The fixed housing front wall 26 has a passageway 114 with an external connection 116. The passageway extends inwardly along flange 108 and has a circumferential end portion 118. The rotary housing inwardly extending flange 110 has a passageway 120 mating with the circumferential portion 118 of passageway 114 in fixed housing front wall 26. Suitable shoulder means 122 are provided on annular flange 108 so that fluid flowing from passageway 114 enters passageway 120 of rotating housing front end portion 36. The passageway 120 in rotating housing 34 communicates with a chamber 124 formed by the piston 88 and a rear wall 126 of rotary housing front end portion 36. The external connection 116 of passageway 114 is arranged to be connected to the lubricating system of the engine that drives crank shaft 14 so that lubricating fluid is continuously supplied to passageway 114 when the engine is operating. The fluid flows through passageway 114 into passageway 120 and thence into chamber 124. The rotary housing front end portion 36 has fluid outlet passageways 128 adjacent the circumferential edge portion 40. The passageways 128 communicate with chamber 124 and are arranged to convey fluid from chamber 124 therethrough to the inner portion of fixed housing 12. The fixed housing 12 has an outlet port 130 which is arranged to be connected to a sump or reservoir and convey the fluid from the internal portion of fixed housing 12. The fixed housing 12 has another outlet opening 132 in the front end portion.

Figure 3:
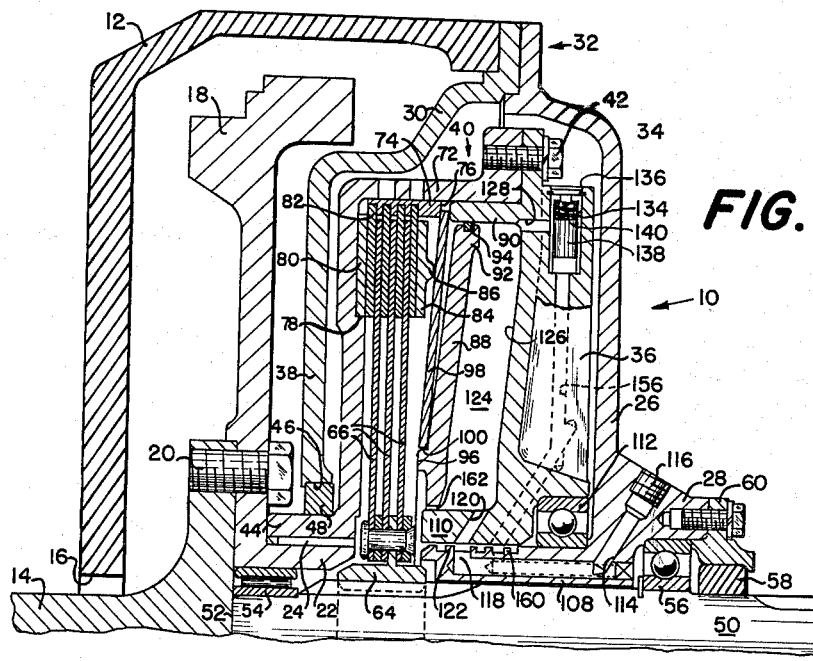
FIGURE 3 is a fragmentary view similar to FIGURE 1 illustrating our improved clutch in an engaged position.
Figure 4:
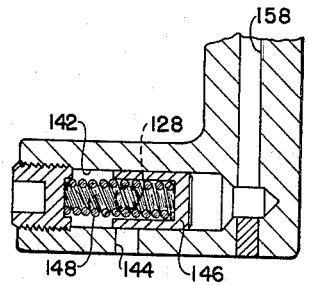
FIGURE 4 is a view similar to FIGURE 2 illustrating the valve member in a closed position.

The rotary housing front end portion 36 has a cylindrical valve bore 134 extending radially therefrom adjacent the outer circumferential edge 40 (see FIGURES 1 and 3). The outlet passageway 128 opens into the valve bore 134. The bore 134 has has an outlet port 136. A cylindrical valve 138 is positioned in bore 134 and movable longitudinally therein. A coil spring 140 urges the valve member 138 away from the passageway 128 to permit the flow of fluid from chamber 124 therethrough. The rotary housing front end portion 36 also has a tangentially extending cylindrical valve bore 142 (see FIGURES 2 and 4). The passageway 128 intersects the side wall of bore 142. The housing front end portion 36 has an outlet port 144 extending radially therefrom which connects with bore 142 to permit passage of fluid from passageway 128 to the internal portion of fixed housing 12. A cylindrical valve 146 is positioned in bore 142 and is movable longitudinally therein. A spring 148 urges the valve 146 toward an open position away from the passageways 128 and outlet port 144. With the valves in the positions illustrated in FIGURES 1 and 2, lubricating oil entering passageway 114 passes through passageway 120 into chamber 124 and leaves chamber 124 through passageways 128 and valve bores 134 and 142. Thus, with the valves in the position illustrated in FIGURES 1 and 2 the clutch discs 66 and 82 are disengaged and torque is not transmitted from engine crank shaft 14 to clutch output shaft 50.

The fixed housing front wall 26 has another passageway 150 therein which terminates in a circumferential end portion 152 and has an external connection 154. The rotary housing front end portion 36 has a pair of radially extending passageways 156 and 158 which mate with the circumferential portion 152 so that fluid supplied through passageway 150 is conducted to both radial passageways 156 and 158. Suitable shoulder type seal means 160 are provided between circumferential end portion 152 and radial passageways 156 and 158. The passageway 156 opens into cylindrical valve bore 134 and passageway 158 opens into cylindrical valve bore 142. Thus when fluid under pressure is supplied through passageway 150 to passageways 156 and 15, valve members 138 and 146 are moved into overlying relation with the outlet passageway 128 thereby trapping the lubricating fluid within the chamber 124. The relative resilience of springs 140 and 148 may be such that valve 138 may move downwardly under the centrifugal force exerted on rotary housing 34 to either completely or partially close passageway 128 at a predetermined speed of rotation of crank shaft 14. Valve 146, however, is not influenced to any great extent by the centrifugal force of the rotating housing 34 because of its tangential arrangement in housing front end portion 36.

The piston 88 has passageways 162 adjacent its inner circumferential edge portion. The passageways 162 connect the chamber 124 with the inner portion of rotary housing 34 that houses the clutch discs 66 and 82. When the valves 138 and 146 close passageways 128 and lubricating oil is continually pumped into chamber 124, the excess lubricating oil passes through passageways 162 into the inner portion of rotary housing 34 and serves to cool the clutch discs 66 and 82. The rotary housing rear portion 38 has a plurality of radial bores 164 through which excess lubricant flows from the inner portion of rotary housing 34 into the inner portion of fixed housing 12 and then flows through outlet port 130 to the sump or reservoir.

Operation

The engine crank shaft 14 is directly connected to the rotary housing 34 so that housing 34 rotates with and at the same speed as engine crank shaft 14. The engine lubricating oil is conducted through passageways 114 and 120 into chamber 124. The centrifugal force of the rotating housing 34 conveys the lubricating oil toward the outer circumferential edge portion of the chamber 124 and the oil flows from the chamber 124 through passageways 128. Thus, when valves 138 and 146 are in the retracted position, as illustrated in FIGURES 1 and 2, engine lubricating oil continuously circulates through chamber 124 and the clutch is in the disengaged position so that torque is not transmitted from engine crank shaft 14 to clutch output shaft 50. When it is desired to engage clutch 10, fluid under pressure is conducted from an external source through passageways 150 to passageways 156 and 158 to urge respective valves 138 and 146 against the resilient force of respective springs 140 and 148 causing the valves to move into overlying relation with passageways 128. The rotation of rotary housing 34 exerts a centrifugal force on the fluid within chamber 124 to move piston 88 axially and through lever 98 urge the clutch plates 66 and 82 into frictional engagement with each other so that torque is then transmitted from engine crank shaft 14 to clutch output shaft 50. The excess lubricating oil, after chamber 124 has expanded to the position illustrated in FIGURE 3, flows through passageways 162 into the inner portion of rotary housing 34 to cool clutch discs 66 and 82.

To disengage clutch 10 the fluid pressure exerted through passageways 156 and 158 is released and the valve members 138 and 146 retract to the positions illustrated in FIGURES 1 and 2. The resiliency of lever 98 urges piston 88 to the position illustrated in FIGURE 1 so that clutch discs 66 and 82 are not frictionally engaged and torque is not transmitted from engine crank shaft 14 to output shaft 50.

With this arrangement a soft clutching engagement between engine shaft 14 and clutch output shaft 50 is obtained in that the frictional force engaging the clutch discs 66 and 82 is dependent upon the centrifugal force exerted on the fluid within chamber 124. Thus when valve members 138 and 146 are closed to actuate the clutch 10 there is a gradual increase in pressure of the fluid within the chamber to a pressure that is required to transmit torque developed by the engine so that the clutch output shaft is smoothly coupled to the engine shaft. There is a minimum loss of efficiency with this arrangement when the clutch 10 is engaged.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:
1. In a fluid operated clutch the combination comprising, a drive shaft, a driven shaft arranged axially with said drive shaft, an annular housing secured to and rotatable with said drive shaft, said driven shaft extending into said housing, a plurality of clutch discs positioned within said housing, alternate clutch discs being nonrotatably secured to said driven shaft and intermediate clutch discs being nonrotatably secured to the inner wall of said housing and being movable axially relative thereto, actuator means within said housing to frictionally engage said clutch discs to each other, a portion of said actuator means forming a chamber within said housing, said housing having a fluid inlet passageway adjacent said housing inner circumferential edge portion, said fluid inlet passageway communicating with said chamber, said housing having a fluid outlet passageway adjacent said housing outer circumferential edge portion, said fluid outlet passageway communicating with said chamber, means to continuously supply fluid to said chamber through said inlet passageway when said drive shaft is rotating, said fluid being adapted to circulate through said chamber, control means including valve means within said outlet passageway, biasing means urging said valve means open for passage of fluid therearound, and control means operable to close said valve means against the urging force of said biasing means and stop the circulation of fluid through said chamber, said control means including fluid actuated means operable to be actuated by a fluid other than said fluid within said chamber, said fluid within said chamber operable by means of the centrifugal force caused by the rotation of said housing to actuate said actuator means and frictionally engage said clutch discs to each other to thereby transmit torque from said drive shaft to said driven shaft.

2. A fluid operated clutch as set forth in claim 1 in which said actuator means includes an annular pressure plate positioned within said housing and axially movable therein to frictionally engage said clutch discs to each other, an actuating lever having its outer end portion pivotally secured to said housing inner wall, an annular piston positioned within said housing and forming a wall of said chamber, said actuating lever inner end portion abutting said piston, said piston being operable under the centrifugal pressure of said fluid within said chamber to move axially and through said lever urge said pressure plate against said clutch discs to frictionally engage said clutch discs to each other.

3. A fluid operated clutch as set forth in claim 2 in which said annular pressure plate has an annular boss extending axially away from said clutch discs, said annular boss positioned in abutting relation with an intermediate portion of said lever, said lever pivotally secured to the inner wall of said housing so that the force exerted by said lever on said pressure plate is greater than the force exerted by said piston on said lever.

4. A fluid operated clutch as set forth in claim 1 in which said actuator means includes an annular pressure plate positioned within said housing and axially movable therein to frictionally engage said clutch discs to each other, an annular piston positioned within said housing and forming a wall of said chamber, and an annular dished resilient lever positioned between said piston and said pressure plate, said lever having a plurality of radially inwardly extending slots forming inwardly extending fingers, said resilient lever arranged to urge said piston away from said pressure plate.

5. A fluid operated clutch as set forth in claim 4 in which said annular lever has an outer circumferential edge portion and an inner circumferential edge portion, said annular lever outer circumferential edge portion being pivotally secured to said housing inner wall and said inner circumferential edge portion abutting said piston, an intermediate portion of said lever arranged to abut said pressure plate and transmit axial movement from said piston to said pressure plate.

6. A fluid operated clutch as set forth in claim 1 in which said fluid inlet passageway is adapted to be connected to an engine lubricating system so that lubricating fluid is continuously circulated through said chamber when said engine is operating and said clutch is disengaged.

7. A fluid operated clutch as set forth in claim 1 in which said actuator means has an axially extending passageway adjacent said inner circumferential portion of said housing, said last named passageway connecting said chamber with a portion of said housing enclosing said clutch discs, said last named passageway arranged to conduct fluid from said chamber to the inner portion of said housing, said fluid from said last named passageway serving as a heat exchange medium with said clutch discs.

8. A fluid operated clutch as set forth in claim 1 in which said fluid actuator means includes an annular piston that forms a wall of said chamber, said piston having axial passageways adjacent said piston inner circumferential edge portion, said passageways arranged to conduct fluid supplied to said chamber from said chamber into said housing.

9. In a fluid operated clutch the combination comprising a drive shaft, a driven shaft arranged axially with said drive shaft, an annular housing secured to and rotatable with said drive shaft, said driven shaft extending into said housing, a plurality of clutch discs positioned within said housing, alternate clutch discs being nonrotatably secured to said driven shaft and intermediate clutch discs being nonrotatably secured to the inner wall of said housing and movable axially relative thereto, actuator means within said housing to frictionally engage said clutch discs to each other, a portion of said actuator means forming a chamber within said housing, said housing having a fluid inlet passageway adjacent said housing inner circumferential edge portion, said fluid inlet passageway communicating with said chamber, said housing having a fluid outlet passageway adjacent said housing outer circumferential edge portion, said fluit outlet passageway communicating with said chamber and extending axially through said housing, said housing having a cylindrical valve chamber adjacent said housing outer circumferential edge portion, said fluid outlet passageway intersecting the side wall of said valve chamber, a cylindrical valve member positioned in said valve chamber and arranged to move longitudinally in said chamber, spring means urging said valve member in said valve chamber to open said fluid outlet passageway, said housing having a radial passageway communicating with said valve chamber, means to supply fluid under pressure to said radial passageway to move said valve member into overlying relation with said fluid outlet passageway to thereby close said fluid outlet passageway, means to continuously supply other fluid to said chamber when said drive shaft is rotating, said fluid being adapted to circulate through said chamber, said valve member upon actuation by fluid under pressure in said radial passageway arranged to close said housing fluid outlet passageway and stop circulation of fluid through said chamber, said fluid within said chamber operable by means of the centrifugal force caused by the rotation of said housing to actuate said actuator means and frictionally engage said clutch discs to each other to thereby transmit torque from said drive shaft to said driven shaft.

10. In a fluid operated clutch as set forth in claim 9 in which said cylindrical valve chamber extends radially in said housing and includes a fluid outlet port adjacent the radial end portion of said chamber, said spring means urging said valve member radially inwardly, and said fluid under pressure operable to move said valve member radially outwardly in said valve chamber.

11. In a fluid operated clutch as set forth in claim 9 in which said cylindrical valve chamber extends tangentially in said housing and includes a fluid outlet port in said chamber side wall, said spring means urging said valve member away from said fluid outlet port, and said fluid under pressure operable to move said valve member in said chamber into overlying relation with said fluid outlet passageway and said fluid outlet port.

12. In a fluid operated clutch the combination comprising a drive shaft, a driven shaft arranged axially with said drive shaft, an annular housing secured to and rotatable with said drive shaft, said driven shaft extending into said housing, a plurality of clutch discs positioned within said housing, alternate clutch discs being nonrotatably secured to said driven shaft and intermediate clutch discs being nonrotatably secured to the inner wall of said housing and being movable axially relative thereto, actuator means within said housing to frictionally engage said clutch discs to each other, a portion of said actuator means forming a chamber within said housing, said housing having fluid inlet passageways adjacent said housing inner circumferential edge portion, said fluid inlet passageways communicating with said chamber, said housing having fluid outlet passageways adjacent said housing outer circumferential edge portion, said fluid outlet passageways communicating with said chamber and extending axially through said housing, said housing having a pair of cylindrical valve chambers adjacent said housing outer circumferential edge portion, said fluid outlet passageways intersecting the side wall of said valve chambers, said cylindrical valve chambers each having a cylindrical valve member positioned therein and arranged to move longitudinally within said chamber, spring means in each of said valve chambers urging said valve member to open said fluid passageway, one of said valve chambers extending radially in said housing, said other valve chamber extending tangentially in said housing, both of said valve chambers having fluid outlet ports extending through said housing, said housing having a radially extending passageway communicating with each of said valve chambers, means to supply fluid under pressure to said radial passageway to move said valve members into overlying relation with said fluid outlet passageways to thereby close said fluid outlet passageways, means to continuously supply other fluid to said chamber when said drive shaft is rotating, said fluid being adapted to circulate through said chamber, said valve members upon actuation by fluid under pressure in said radial passageways arranged to close said housing fluid outlet passageway to stop circulation of fluid through said chamber, said fluid within said chamber operable by means of the centrifugal force caused by the rotation of said housing to actuate said actuator means and frictionally engage said clutch discs to each other to thereby transmit torque from said drive shaft to said driven shaft.

References Cited by the Examiner
UNITED STATES PATENTS

| | | |
|---|---|---|
| 2,325,814 | 8/43 | Tyler. |
| 2,328,090 | 8/43 | Nutt et al. |
| 2,381,786 | 8/45 | Tyler. |
| 2,521,239 | 9/50 | McDowall et al. |
| 2,853,167 | 9/58 | Kelley. |
| 2,876,743 | 3/59 | Maki. |
| 2,960,202 | 11/60 | Stevens et al. |
| 3,007,562 | 11/61 | Aschauer. |

DAVID J. WILLIAMOWSKY, *Primary Examiner.*